United States Patent
Montgomery et al.

(10) Patent No.: US 7,123,709 B1
(45) Date of Patent: Oct. 17, 2006

(54) METHOD FOR AUDIO STREAM MONITORING ON BEHALF OF A CALLING PARTY

(75) Inventors: Warren Allen Montgomery, DeKalb, IL (US); John Alvan Voelker, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 781 days.

(21) Appl. No.: 09/677,919

(22) Filed: Oct. 3, 2000

(51) Int. Cl.
*H04M 7/00* (2006.01)

(52) U.S. Cl. .............................. 379/221.08; 379/93.01; 379/201.01; 379/265.09

(58) Field of Classification Search ........... 379/201.01, 379/202.01, 67.1, 88.01, 88.04, 88.07, 88.22, 379/90.01, 265.01, 265.06, 221.08, 93.01; 704/200, 231, 233, 246
See application file for complete search history.

(56) References Cited

U.S. PATENT DOCUMENTS

| 5,844,896 | A | * | 12/1998 | Marks et al. ............... 370/385 |
| 5,848,163 | A | * | 12/1998 | Gopalakrishnan et al. .... 381/56 |
| 6,349,136 | B1 | * | 2/2002 | Light et al. ............ 379/202.01 |
| 6,556,670 | B1 | * | 4/2003 | Horn ...................... 379/202.01 |
| 6,870,807 | B1 | * | 3/2005 | Chan et al. ................. 370/201 |

FOREIGN PATENT DOCUMENTS

EP     1156647 A1 * 11/2001

* cited by examiner

*Primary Examiner*—Ovidio Escalante

(57) ABSTRACT

A method of audio stream monitoring on behalf of a calling party by filtering an audio stream sent to an audio-capable device. The audio stream is received from an audio stream source and compared to at least one audio stream portion. If an audio stream portion is identified for removal from the audio stream, it is removed from the audio stream resulting in a filtered audio stream.

20 Claims, 4 Drawing Sheets

METHOD FOR AUDIO STREAM MONITORING ON BEHALF OF A CALLING PARTY

BACKGROUND OF THE INVENTION

This invention relates to assisting a calling party whose call is queued; for example, at a call center and, in particular to audio stream monitoring on behalf of the calling party.

The calling party calls a customer service number for assistance. The call is routed to a call center where it is queued until a customer service representative is available to take the call. While the call is queued, messages such as "Your call is important to us, please . . . . " are repetitively played toward the caller. Sometimes music is played. Eventually, the call is answered by the customer service representative.

The problem, from the point of view of the calling party, is that the caller must stay on the line and endure the music and repetitive messages for potentially a long period of time.

SUMMARY OF THE INVENTION

The problems noted above are solved in accordance with the invention and a technical advance is achieved in the art, by having an audio stream monitor service provided by the telephone network that can be activated for calls placed into a call queue. The audio stream monitor service will remove repetitive unwanted messages from the audio stream. In addition or alternatively, the audio stream monitor service will also present to the caller, via audio on the telephone or via displays such as a TV or PC, estimates of how long the call will remain queued.

BRIEF DESCRIPTION OF THE DRAWINGS

The advantageous features of the invention will be explained in greater detail and others will be made apparent from the detailed description of the present invention which is given with reference to the several figures, in which.

DETAILED DESCRIPTION

Figure 1:
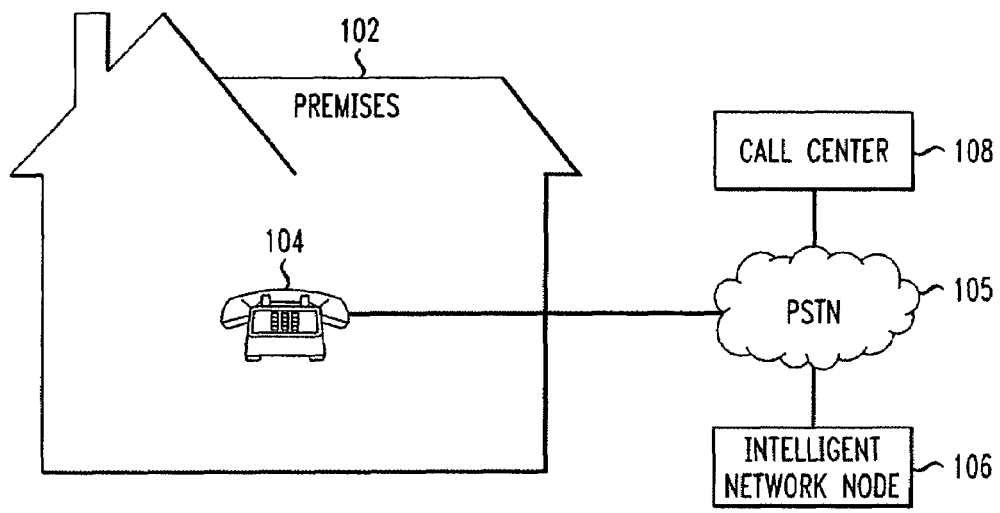
FIG. 1 is a diagram of a telephonic device connected to a telephone network having a connection with a call center, a service control point (SCP), and a service node (SN)in accordance with an embodiment of the invention.

In FIG. 1, the telephonic device 104 in a premises 102 is connected to a communication network, such as a public switch telephone network (PSTN)105. Likewise, a call center 108 is connected to the PSTN 105. The PSTN 105 can consist of multiple interconnected telephone networks employing a variety of access and backbone transport technologies. The access technologies include traditional POTS, ISDN, DSL, hybrid fiber/coax cable, and wireless. The transport technologies may selectively include traditional circuit switching and various packet, frame and cell technologies. The particulars of access and transport are not central to the invention. The telephone network contains two kinds of intelligent network devices: a service control point (SCP) and a service node (SN). The SCP has only a signaling connection to switches in the telephone network (i.e. no voice streams pass through the SCP) which suffice since the SCP's role is to provide service logic and database access for switches. The SN has both bearer and signaling connection to the switches of the telephone network. In one embodiment of this invention, the SN filters the voice (audio) stream that passes through it for queued calls. In another, it relays updates from the call center (an audio stream source) to the caller regarding estimated remaining wait time. The SN is referred to as an "intelligent network node" or "IN node". The intelligent network node 106 is shown in FIG. 1 as being coupled to PSTN 105.

The caller places a telephone call using telephonic device 104 and enters a telephone number that generally puts callers "on hold", queuing their calls for a long time until a service representative or help desk person is available to talk with the caller. The telephone network switch handling the call in the PSTN 105 recognizes the called directory number as one requiring it to query an intelligent network SCP in PSTN 105 for directives on how to proceed with the call. The SCP, possibly with interaction to an external database, recognizes the called directory number as belonging to a call center. It also recognizes that the calling party is subscribed to the audio stream monitor service (ASMS) located on intelligent network node 106. So the SCP orders the switch to transfer the call path so that the caller is connected to the service node (intelligent network node 106). The SCP also orders the intelligent network node 106 to offer the ASMS, identifies the telephone number of the call center 108 the user has called, and supplies other caller related information it may have gathered from its database queries (e.g. information on caller devices capable of receiving audio and text). The service node then calls that telephone number and, upon answer, begins monitoring the call stream in both directions between the call center 108 and the caller at telephonic device 104.

The ASMS executing in the intelligent network node 106 (e.g. a SN) removes certain audio segments from the audio stream flowing from the call center 108 to the telephonic device 104. There are two ways the ASMS can learn that a particular audio stream segment (e.g. "Your call is important to us. Please stay on the line and your call will be answered by the first available representative.") should be removed from the audio stream. The first way is from a database of audio stream segments (most likely digitally encoded) compiled by the service provider and keyed with the telephone number dialed by the caller at the telephonic device 104.

The second way is by receiving a signal from the caller via the telephonic device 104 during or shortly after permitting that segment to flow to the telephonic device 104. This signal from the caller could be, for example, a particular telephone set key pad touch tone sequence. The ASMS would maintain a record of that flagged audio stream segment and remove subsequent instances of it from the audio stream sent to the telephonic device 104. The caller then benefits from not having to listen to unwanted messages. Receiving a filtered version of the audio stream from the call center 108 is particularly advantageous to the caller at the premises 102 if the audio from the call center 108 is sent not only to the user's telephonic device 104, but also to the television set (video display 204, FIG. 2), personal computer 212, or similar device with audio output capabilities. The caller can then watch the television set while his call is queued and hear only the voice of the service representative when that person finally comes onto the call. With the telephonic device 104, FIG. 1, nearby or with another device that is audio-capable and equipped with a microphone, such as modified TV (or set top box) 204, FIG. 2, telephonic device 104, or PC 212, the caller then respond to the initial greeting from the customer service representative.

In an alternative embodiment, the service is initiated when the caller dials a telephone number assigned to the ASMS service. The customer dials the ASMS number because he/she needs to place a call that will likely be queued, and the customer wants the assistance of the ASMS for this call. The ASMS number is switched to an IN node 106 implementing ASMS. The IN node 106 then solicits (perhaps with an audio announcement, perhaps only with dial tone) the user to dial the digits of the customer service or other call center type destination. Upon receiving those digits, the intelligent network node 106 then calls the call center 108 and connects the call center 108 to the telephonic device 104 located at the premises 102, that permits the IN node 106 to monitor the audio streams in both directions and filter those streams. The service then proceeds as above.

In another embodiment, the caller calls the call center 106 directly. After that call is established and while the call is queued, the caller invokes the assistance of ASMS. So the user keys a particular keypad sequence or alternatively does a switch-hook on his telephonic device 104. The switch located in the PSTN 105 using the established intelligent network technique of mid-call triggers, recognizes that signal and queries the SCP for direction. The SCP then has the switch cause the bi-directional audio stream between the telephonic device 104 and call center 106 to flow through the intelligent network node 106. The intelligent network node 106 then activates the ASMS which operates as above.

When the customer service representative finally answers the call his/her voice (the combinations of words used and speaker specific voice characteristics) will presumably not match that of any of the templates of audio segments to be removed from the audio stream. Therefore, the ASMS will not filter out the customer service representative's speech. The user and the customer service representative can converse normally with no audio stream segments being removed by ASMS from either direction of the audio stream since templates will not be matched.

To release the computational resources dedicated to monitoring the audio stream, the ASMS may disengage upon detecting significant speech from the user toward the call center 108. Alternatively, it may disengage upon detecting an explicit signal from the caller via the telephonic device 104; for example, a switch hook or key pad tone sequence. Alternatively, it may disengage upon, or some fixed time after, encountering some pre-provisioned number of audio segments from the call center 108 toward the user that neither match a template call segment nor engender an explicit user signal to declare the segment to be a template. Alternatively, the service may disengage when the call ends.

Figure 2:
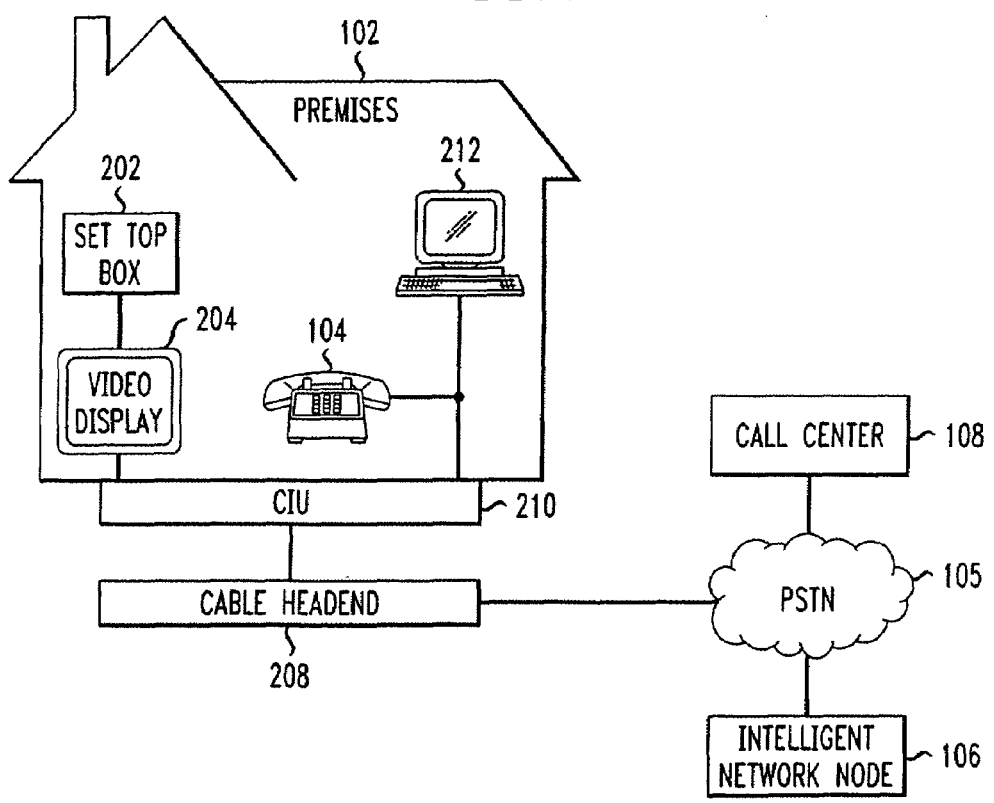
FIG. 2 is a diagram of a premises having a telephonic device, computer, video device (e.g. TV) coupled to a cable distribution system wherein the telephone network having a SCP and SN is coupled to the cable distribution system and a call center in accordance with an embodiment of the invention.

Turning to FIG. 2, the entities of FIG. 1 are shown with the addition of both a computer 212, FIG. 2, and a television (video display) 204, FIG. 2 in the premises 102. The ASMS service is invoked by one of the means discussed above. The filtering of the audio steam towards the caller can be performed as described above. This filtered audio stream can be delivered to the television 204 or computer 212 so that the caller can watch television or use the PC while listening for the customer service representative coming on line and without having to listen to annoying repetitive messages.

Various means can be used to permit the caller to speak with the customer service representative quickly after he announces his availability. The simplest means is for the caller to have a telephonic device 104 near the television 204. More advanced schemes involve incorporating a microphone into the television 204 or set top box (STB) 202 to permit the caller to use that microphone to speak to the customer service representative.

The audio associated with the television program being watched is suppressed without suppressing the audio from the customer service representative if the two audio streams maintained separate identities (separate RF channels or packet RTP streams) until they reached the STB 202. The STB 202 suppresses the TV program audio when audio from the call center 108 is present. The caller signals the STB 202 (e.g. via infrared beam) when he "answers the customer service representative", and the STB 202 would then suppress programming audio on the television 204 for the rest of the call. Alternatively, the television set mute control controls only the programming audio, and the user could activate that mute control when the customer service representative became available.

In another embodiment the following service can be offered to the caller in conjunction with or in place of the audio stream filtering: The intelligent network node 106 determines, from database information, that the call center 108 is a cooperating call center. That is, the call center 108 will provide estimates of remaining time until a service representative will take the call or provide similar data regarding the status of the queued call. Cooperating call centers have a business relationship with the operator of the intelligent network. Revenue the intelligent network operator gets from selling this queued call assistance service to end-users is presumably to be shared with the call centers supplying the updated estimates of remaining wait time. Indeed, the IN node 106 plays a mediating role not only with respect to relaying the estimated remaining wait time information, but also in verifying to the call center 108 that it will be paid for providing those estimates. There is no need for each call center 108 to have a bilateral agreement with each potential caller who would like this service.

The IN node 106 arranges for the wait time information to be presented to the user via a variety of means. The IN node 106 converts the call center 108 provided information to an audio form (text-to-speech) and sends it to the telephonic device 104. Or, alternatively the wait time information is displayed on the television 204 or PC 212. To permit the caller to select from among these options, the caller is played an audio announcement explaining the options for receiving queue status update information concerning their call. The IN node 106 asks the user if they want this information delivered, and if so, to which household device, or set of devices, they want it delivered.

With cable telephony, the intelligent network node 106 can acquire from pre-provisioned data or from cable telephony network management entities (perhaps located at the cable head end 208) the current IP address and port number of the text display capability of the television 204, cable interface unit 210, or set top box 202. Then, if the user signaled that he/she wanted queue status updates sent to their television, the IN node 106 arranges to get those updates delivered there. Said arrangement may take the form of telling the call center 108 to send the queue status update data to the IP address/port used by the television 204. Alternatively, the IN node 106 can itself receive the data from the call center 108 and relay it to the television 204. Alternatively, the user, by appropriate input to his television 204 or PC 212, may selectively cause those devices (or attached devices like a set top box 202) to signal the identity of their address to the intelligent network node 106 in a message that also requests that queued call status messages be sent to that address.

Figure 3:
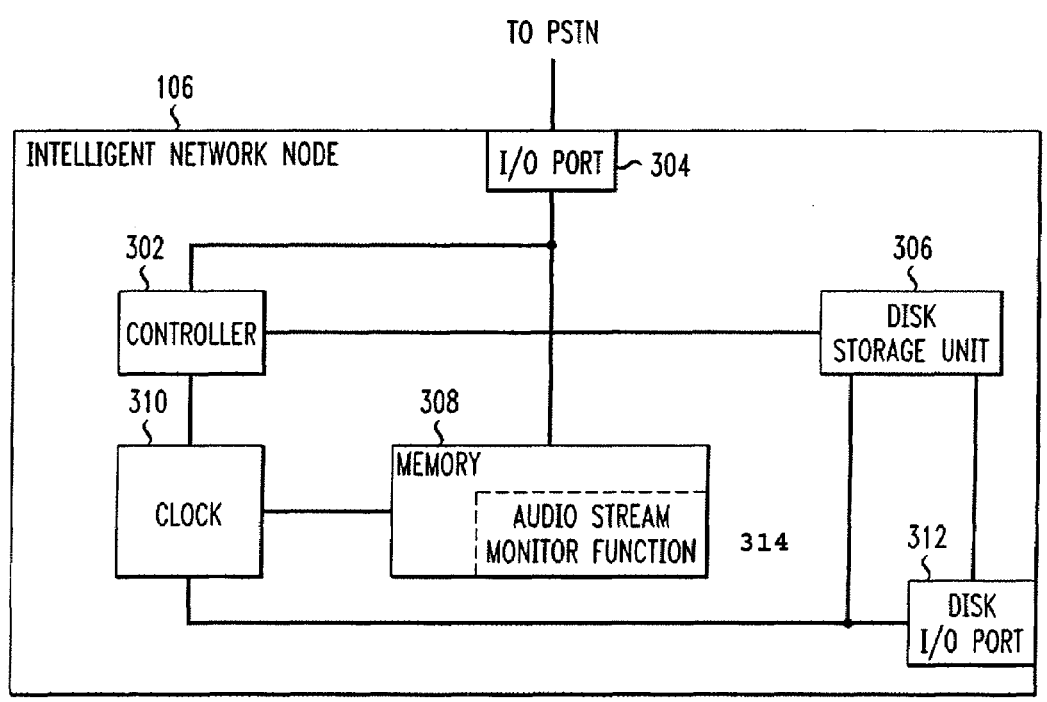
FIG. 3 is a block diagram of the intelligent network node having an audio stream monitor service in its memory in accordance with an embodiment of the invention.

In FIG. 3, a block diagram of the IN node 106 having an audio stream monitor function 314 in memory 308 is shown. The IN node 106 has a controller 302 coupled to a I/O port 304, a clock 310, a disk storage unit 306, and a memory 308. The clock is coupled to the I/O port, the controller 302, the memory 308, the disk storage unit 306, and the disk I/O port 312. The disk storage unit 306 is coupled to the disk I/O port 312, the clock 310, and the controller 302. Additionally, a portion of memory 308 is occupied by the audio stream monitor function 314.

The I/O port 304 receives and sends messages via audio streams to and from the PSTN network. The I/O port 304 also receives timing from the clock 310 enabling the receive and transmit audio streams to be synchronized with the PSTN network. In an alternate embodiment the clocking signal is not simply generated by the clock 310, rather an external clock signal is received (slaved to) by the clock 310. Additionally, the clock 310 provides timing to the memory 314, controller 302, disk storage unit 305, and disk I/O port 312 over one or more data buses.

The activation of the audio stream monitor function 314 is accomplished by the I/O port 304 receiving the call activation signal entered by the calling party at the telephonic device 104, FIG. 1. The controller 302, FIG. 3, processes the call activation signal and notifies the audio stream monitor function 314 running in memory 308 of the activation. In an alternate embodiment with the cooperating call center device 108, FIG. 2, the audio stream monitor function or the cooperating call center device 108 requests an identification code (IP address, phone number, etc. . . . ) be entered by the calling party using a keypad of the telephonic device 104, FIG. 1, voice commands, interactive voice response (an interactive sequence of playing announcements and receiving voice or tone responses from the user), or other known methods of entering data through a telephonic device.

Using a database, the IN node may translate the calling party supplied information (e.g. the spoken phrase "TV") to an IP or other address format usable to deliver information to a receiver, e.g. the user's TV. The determined identification code, such as an IP address, is then received at the requesting device and stored in a record associated with the call. The stored identification code is then used to send messages to the identified device about the progress of the call.

In another embodiment the following service can be offered to the user in conjunction with or in place of the audio stream filtering: One of the intelligent network nodes, the SCP or SN, determines, from database information, that the call center is a cooperating call center. That is, the call center will provide estimates of remaining time until a service representative will take the call or provide similar data regarding the status of the queued call. Cooperating call centers would likely have a business relationship with the operator of the intelligent network. Revenue the intelligent network operator gets from selling this queued call assistance service to end-users would presumably be shared with the call centers supplying the updated estimates of remaining wait time. Indeed, the IN node plays a mediating role not only with respect to relaying the estimated remaining wait time information, but also in verifying to the call center that it will be paid for providing those estimates. There is no need for each call center to have a bilateral agreement with each potential caller who would like this service.

The call connection between the calling party and the call center had been established with the help of the IN node which thereby came to know the directory number (DN) the calling party had dialed to reach the call center or some telephone call termination identifier derived from that number. Likewise, the IN node came to know the DN of the calling party. Using a database query or its own data stores, the IN node can map the DN of the call center to an IP address or similar identifier for the call center. Using this IP address, the IN node can send a message to the call center requesting that the call center provide periodic estimates of remaining wait time applicable to the currently queued caller. The IN node can identify to the call center that particular queued call its request references by, for example, appropriate use of the calling DN associated with that queued call.

The call center can then periodically forward these updated estimates of the queued call's remaining wait time to the IN node over a data channel, perhaps the same channel (say TCP over IP) that the IN node used in making its request to the call center. The IN node will, in turn, forward these updated estimates of wait time to the device of devices (e.g. calling party's TV set) selected by the calling party.

The intelligent network will arrange for that data to be presented to the user via a variety of means. The SN can convert this call center provided data to audio form (text-to-speech) and send it to the user's telephone. Or it can be displayed on the user's television or PC. To permit the user to select from among these options, the user can be played an audio announcement explaining their options for receiving queue status update information concerning their call. The SN can ask the user if they want this information delivered, and if so, to which household device, or set of devices, they want it delivered.

With cable telephony, the intelligent network can acquire from pre-provisioned data or from cable telephony network management entities the current IP address and port number of the television's or set top box's text display capability. Then, if the user signaled that he/she wanted queue status updates sent to their TV, the intelligent network node (SCP or SN) could arrange to get those updates delivered there. Said arrangement may take the form of telling the call center to send the queue status update data to the IP address/port used by the TV. Alternatively, the intelligent network node could itself receive the data from the call center and relay it to the TV. Alternatively, the user, by appropriate input to his TV or PC, may cause those devices (or attached devices like a set top box) to signal the identity of their address to the intelligent network in a message that also requests that queued call status messages be sent to that address.

In the present embodiment (i.e. without cooperation of the call center device), the controller 302, FIG. 3, after activation, sets up an audio stream connection through the IN node 106, FIG. 3, connecting the telephonic device 104, FIG. 1, and the call center device 108. The audio stream from the call center 108 is received at the I/O port 304, FIG. 3, of the IN node 106. The controller 302 routes the received audio stream to the audio stream monitor function 314. The received audio stream is segmented into portions and temporarily stored and compared with sample audio stream portions from a database. In order to reduce latency, the sampled audio stream portions are very brief, and their accumulation is stored in the memory 308. If an audio stream match is found, then the audio stream portion matching is filtered from the audio stream. The filtered audio stream is then transmitted from the intelligent network node 106 via the I/O port 304.

If the audio stream received at the premises 102, FIG. 1, contains an undesirable portion of audio in the audio stream, the calling party enters a signal at the telephonic device 104 indicating that the undesirable portion of audio is to be filtered from the received audio stream. The calling party had a predetermined period to act within while the unfiltered audio stream portion is still in memory 308.

Once the call is answered by the call representative, the audio stream monitoring function 106 is deactivated by the controller 302 detecting that two-way conversation is occurring. In an alternate embodiment the controller 302 may deactivate the audio stream monitor after the expiration of an inactivity timer that resides in memory 308.

Figure 4:
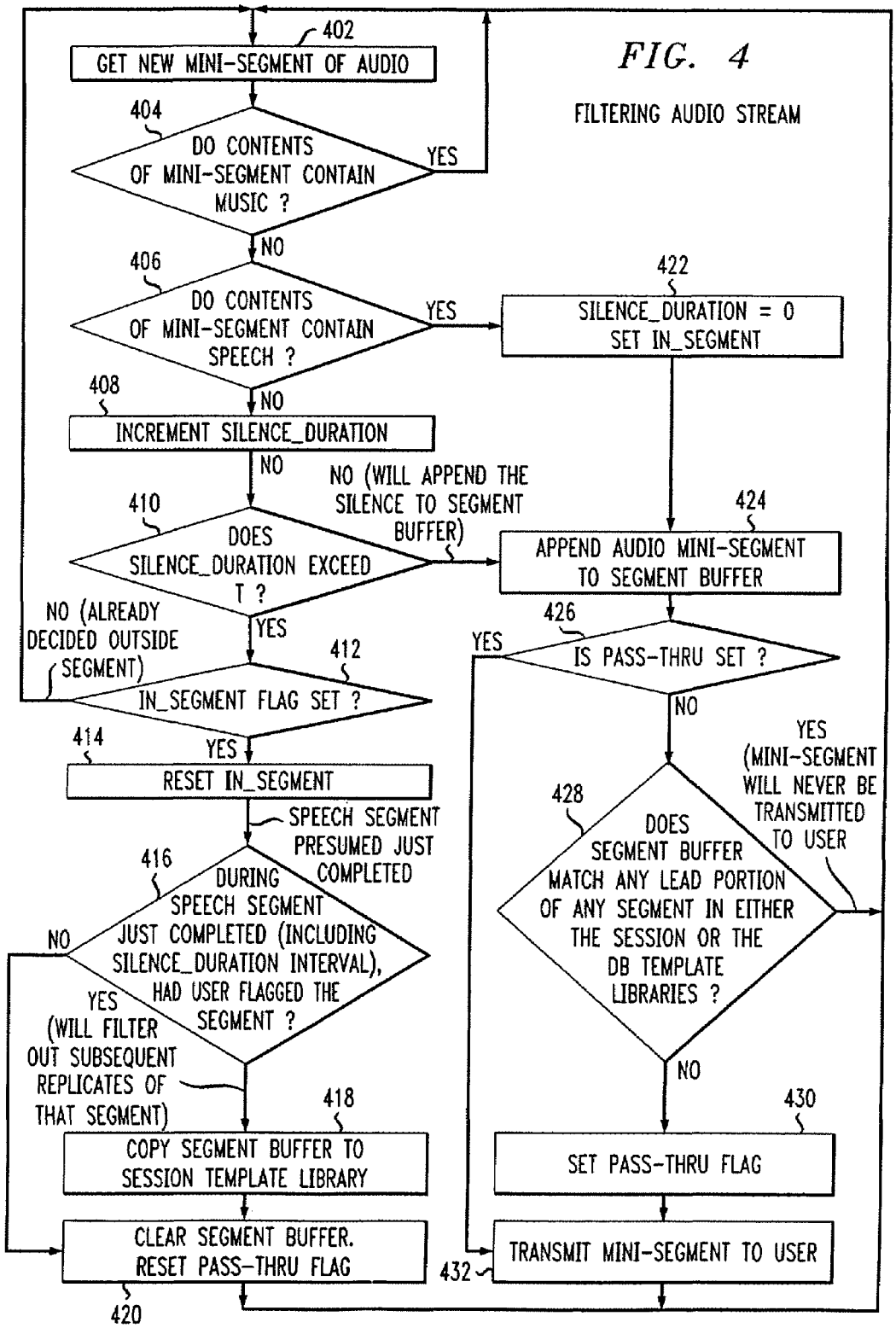
FIG. 4 is a flow chart illustrating the steps of the audio stream monitor service in accordance with an embodiment of the invention.

Turning to FIG. 4, an illustration of the steps involved in filtering via a filtering function, the audio stream from the call center toward the caller while training the filtering function is shown. Training the filtering function involves recognizing a signal from the caller that identifies a particular audio segment as one that the caller does not want to hear again. Then subsequent audio segments that match that template will be removed from the audio stream. In the preferred embodiment, the functions illustrated in this figure are implemented in the IN node 106, FIG. 2.

The term "speech segment" is a message like "Your call is important to us. Please stay on the line and your call will be answered in the order in which it was received." Speech segments are delimited in the preferred embodiment by a gap in speech of some predefined value; for example, five seconds. The term "mini-segment" refers to a much shorter interval of audio (an audio stream portion), for example, of duration 200 milliseconds. Mini-segments are buffered while their contents are evaluated (in the context of earlier mini-segments of the same segment) to decide if they should be played out to the calling party. If they are played out to the calling party, the buffering will have introduced only a short delay since the duration of the mini-segment was short. So, to minimize the delay in sending audio to the calling party (i.e. the audio not filtered out), the mini-segments are of a short duration.

In step 402, a new mini-segment is acquired for analysis. In step 404, that mini-segment is analyzed to determine if it contains music. If yes, return to step 402. If no, go to step 406. Instep 406, the mini-segment is analyzed to see if it contains speech. If yes, go then step 422. If no, then in step 406 the mini-segment contains neither music nor speech, and is what is termed herein "silence". In this "silence" case, go to step 408. In steps 408, 410 and 412 the silence of this mini-segment is classified into one of three categories: (A) part of an accumulation of silence internal to a segment (e.g. silence between words in a phrase), (B) an indication of the end of a segment, or (C) part of an already recognized gap between segments. Step 408 increments, by the duration of the mini-segment, an accumulator of silence duration (since speech last detected) which, in step 410, is tested against the threshold SILENCE_DURATION (for example; 5 seconds). If the threshold has not been exceeded, then the silence is considered internal to the segment and accordingly accumulated in the segment buffer per step 424. If the threshold is exceeded, then in step 412, the IN_SEGMENT flag is tested to see if the current block of silent segments has already been determined to exist external to a voice segment.

If yes, then in step 402, get a new mini-segment. If "No", then the presumed end of a voice segment is detected, from which proceed to step 414.

In step 414, reset IN_SEGMENT to record the fact that the audio stream is currently outside a voice segment. Next go to step 416. In step 416, check for the occurrence, since the start of the most recent audio stream segment, of a telephonic signal that the caller does not want to hear any more replicates of the "current" or just ended audio stream segment. If the caller had so indicated (e.g. by keying certain tones from his telephone key pad), proceed to step 418. In step 418, the audio stream segment just completed, which had been flagged as unwanted by the user, is copied to a "template library" that stores templates of segments flagged by the user during the call that are to be subsequently removed from the audio stream sent to the telephonic device. From step 418 and from a "NO" at step 416, proceed to step 420. In step 420, the segment buffer, where all mini-segments of the just completed segment are accumulated, is cleared. Also in step 420, the PASS-THRU flag is reset so that future mini-segments are not considered eligible for transmission to the user until that flag is again set (in step 430).

Step 422 is entered only when the mini-segment contains speech. In step 422 the SILENCE_DURATION value is set to zero (if it was not already zero) and IN_SEGMENT is set to indicate that the audio stream is within a speech segment. From step 422, go to step 424. In step 424, the mini-segment is appended to the segment buffer which is an accumulation of mini-segments regarded as part of the current speech segment. Step 424 is also entered from a negative answer to the question of step 410 so that intra-segment silence can be inserted into the accumulating segment.

Step 424 leads to step 426. In step 426, check whether the PASS-THRU flag is set. It is set if the contents of the segment buffer are no longer consistent with any template segment, which means there is no longer a justification for removing incoming audio mini-segments from the stream delivered to the user. If step 426 yields a "yes", then go to step 432, otherwise go to step 428.

In step 428, the segment buffer is compared against available templates of audio segments subject to removal from the audio stream sent to the user. These templates include the session template populated in step 418 as well as templates provisioned by the service provider that are used across many calls to the same call center directory number. To implement step 428 many optimizations and elaborations are available to one skilled in the art. Also, the fact that recorded messages played out by the call center are commonly generated from a digital file, means that all call center announcements of the same message have similar bit streams. This fact facilitates comparing the contents of the segment buffer against templates. If step 428 yields a match, go to step 402 without transmitting the current mini-segment to the user. If step 428 yields no match, go the step 430.

In step 430, the PASS-THRU flag is set so that all subsequent mini-segments of the current segment are transmitted to the user without needing to do the processing involved in comparing subsequent enlarged versions of the current segment buffer to template segments. This is a conservative strategy, presuming it is better to err on the side of sending audio to the user instead of suppressing it. Many variations will be apparent to those skilled in the art. Following step 430, step 432 transmits the mini-segment to the user and goes to step 402.

An example of one of many possible enhancements to the simple outline presented by FIG. 408 is to slightly speedup the playback to the user executed during step 432 when step 432 is entered from step 430. The intent of this speedup is to eliminate the lag introduced by both the buffering of the mini-segment and the analysis of step 428.

Another example of an enhancement is to carry out the comparison of the audio stream with templates of segments-for-removal in a streaming manner without buffering mini-segments. This becomes especially feasible once a segment is matched to a template, and the algorithm is simply tracking the newly arriving bits from the call center to successive bits in the already identified template.

Another example of an enhancement is to transmit two or more identical copies of the filtered audio stream to the user. The respective copies are directed to different devices in the customer's residence; e.g. the telephone and a television. (The television would suppress its normal programming audio when the filtered audio from the call center, via the IN node, was non-silent.)

Figure 5:
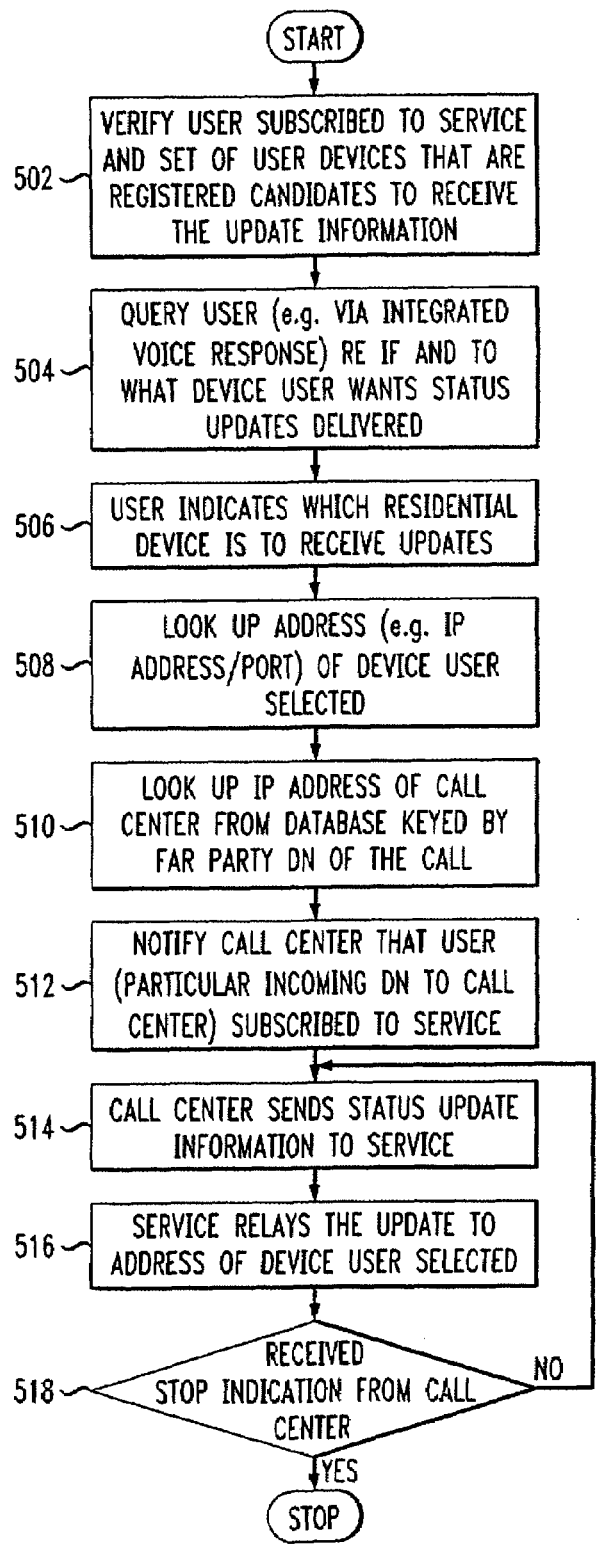
FIG. 5 is a flow chart illustrating the steps of the audio stream monitor service in accordance with an alternate embodiment of the invention.

In FIG. 5 a flow chart illustrating the steps of another embodiment of an audio stream monitor function is shown. This embodiment presumes the call center has agreed to cooperate with the IN node in providing the service to the caller, with updated estimates of how much longer the user will need to wait (an estimate of wait time) for the attention of a customer service representative. (For example announcing or displaying to the user "Remaining estimated wait time is 5 minutes.") The role of the IN node is to relay those updates to the caller. In particular, to relay those updates to the particular device or devices; for example, television, PC, or phone; that the caller had selected to receive and display them and identified by an address such as an Internet protocol address. The address for a particular audio-capable device may selectively be transmitted from a device under the caller's control or be pre-provisioned.

In step 502, the IN node determines whether the caller has subscribed to the service of receiving updates of remaining queued call wait time. Also, if the user has subscribed to this service, step 502 further shows the IN node determining the set of devices that are pre-provisioned candidates for receiving such updates. The IN node can use this set to formulate an audio announcement to the user listing these devices and asking the user to select one or more of them to receive the update information.

In step 504, the IN node queries the user over the established call connection using interactive voice response, a series of announcements and speech recognition (or tone detection) functions to determine whether the user wants to receive these updates and to which devices the updates should be sent.

In step 506, the user supplies the speech or tones (e.g. tones from the telephone key pad) to indicate the selection of a device or devices to receive the updates.

In step 508, the IN node looks up in pre-provisioned data or in network operations systems data, the addresses (e.g. IP addresses/port numbers) of said selected devices.

In step 510, the IN node looks up the address (e.g. IP addresses/port numbers) of the call center. The IN node will have the dialed number used when the caller originally called that call center, and uses the dialed number as a key to said address.

In step 512, the IN node sends a message to the call center requesting updates on estimated remaining wait time for a particular call queued at that call center. The call is referenced by what the call center would regard as the directory number (i.e. telephone number) of the calling party.

In step 514, the call center sends data to the IN node referencing the dialed number of the caller and containing an estimate of remaining wait time.

In step 516, the IN node relays this information to the device or devices selected by the user. The mode of delivery may depend on the device. The format of the information received at the IN node is reformatted for the selected presentation device. For example, a television or PC may receive data for display as text in a window, while a telephonic device may receive an audio message on an audio channel. Also, the telephonic device may receive a distinctive ringing signal. The particular distinctive ringing signal may map, in a pre-provisioned way, with the value of the time remaining data.

In step 518, the IN node checks to see if it has received an indication from the call center that the call is no longer queued. If the call has been dequeued, then stop. If the call has not been dequeued, then go to step 512 awaiting another update from the call center. Stopping will also occur if the call ends.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope.

Although an explanation of embodiments of the present invention have been made above with reference to the drawings, the scope of the invention is defined by the claims which follow.

We claim:

1. A method for modifying an audio stream on behalf of a calling party, the method comprising the steps of:

recognizing, at a telephone network switch, a called directory number requiring a query to an SCP for instructions;

receiving the query from the switch at the SCP;

recognizing that the called directory number is associated with a call center;

determining that the calling party subscribes to an audio stream monitoring service located on an intelligent network node;

receiving an order at the intelligent network node from the SCP;

transferring the call path, in response to the order, such that the calling party is connected to the intelligent network node;

connecting to the call center from the intelligent network node;

monitoring, at the intelligent network node, the audio stream in both directions between the call center and the calling party;

executing the audio stream monitoring service on the intelligent network node;

identifying at least one portion of the audio stream for removal;

removing the at least one portion of the audio stream resulting in a filtered audio stream; and sending the filtered audio stream to the calling party.

2. The method of claim 1 wherein the step of identifying further comprises the step of determining that the at least one portion of the audio stream contains music.

3. The method of claim 1 wherein the step of identifying further comprises the step of determining that the at least one portion of the audio stream contains speech.

4. The method of claim 3 wherein the step of determining further comprises the step of recognizing that the at least one portion of the audio stream that contains speech matches a template of speech that is stored in a memory.

5. The method of claim 4 further comprising the step of saving in the memory via service provisioning the template of speech to be filtered from the audio stream.

6. The method of claim 3 further comprising the steps of detecting a signal from the calling party, and storing as a template of speech in a memory the at least one portion of the audio stream that is temporally associated with the signal.

7. The method of claim 6 in which the signal is a switch hook signal.

8. The method of claim 6 in which the signal is at least one key pad tone.

9. The method of claim 3 further comprising the step of determining that a gap in speech within the audio stream exceeds a pre-provisioned limit.

10. The method of claim 1 further comprising the step of routing the filtered audio stream to at least one other audio-capable device of a plurality of audio-capable devices associated with the calling party.

11. The method of claim 10 wherein the step of routing further comprises the steps of querying a database having at least one pre-provisioned address associated with the at least one other audio-capable devices, receiving the at least one pre-provisioned address in response to querying the database, and sending the filtered audio stream to the at least one other audio-capable device associated with the at least one pre-provisioned address from the database.

12. The method of claim 10 wherein the step of routing further comprises the step of receiving an indication of the at least one other audio-capable device in response to an audible query.

13. An apparatus for modifying an audio stream on behalf of a calling party, comprising:

means for recognizing, at a telephone network switch, a called directory number requiring a query to an SCP for instructions;

means for receiving the query from the switch at the SCP;

means for recognizing that the called directory number is associated with a call center;

means for determining that the calling party subscribes to an audio stream monitoring service located on an intelligent network node;

means for receiving an order at the intelligent network node from the SCP;

means for transferring the call path, in response to the order, such that the calling party is connected to the intelligent network node;

means for connecting to the call center from the intelligent network node;

means for monitoring, at the intelligent network node, the audio stream in both direction between the call center and the calling party;

means for executing the audio stream monitoring service on the intelligent network node;

means for identifying at least one portion of the audio stream for removal; and means for removing the at least one portion of the audio stream resulting in a filtered audio stream.

14. The apparatus of claim 13, wherein the means for identifying at least one portion of the audio stream for removal identifies at least one portion of the audio stream containing music.

15. The apparatus of claim 13, wherein the means for identifying at least one portion of the audio stream for removal identifies at least one portion of the audio stream containing speech.

16. The apparatus of claim 13, further comprising memory means coupled to the controller, having at least one template of speech to be filtered from the audio stream.

17. The apparatus of claim 16, wherein the memory means having the at least one template of speech is populated upon initialization of the apparatus.

18. A system that modifies an audio stream on behalf of a calling party comprising:

a telephone network switch that recognizes a called directory number as a number requiring a query to an SCP for instructions;

the SCP receiving the query from the switch, recognizing that the called directory number is associated with a call center, and determining that the calling party is a subscriber to an audio stream monitoring service located on an intelligent network node;

the intelligent network node receiving an order from the SCP to transfer the call path such that the caller is connected to the intelligent network node, the intelligent network node then calling the call center and monitoring the audio stream in both directions between the call center and the calling party;

the audio stream monitoring service, executing on the intelligent network node, removing selected audio segments from the audio stream flowing from the call center to the calling party.

19. The system of claim 18, wherein selected audio segments are removed by accessing a database of undesired audio segments compiled by the audio stream monitoring service provider and associated with the call center directory number called by the calling party.

20. The system of claim 18, wherein selected audio segments are identified for removal by transmission of a signal from the calling party while a selected audio segment flows between the call center and the calling party.

* * * * *